(12) United States Patent  (10) Patent No.: US 8,588,604 B2
Momose  (45) Date of Patent: Nov. 19, 2013

(54) IMAGING APPARATUS (75) Inventor: Hideaki Momose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/013,638

(22) Filed: Jan. 25, 2011

(65) Prior Publication Data

US 2011/0182569 A1 Jul. 28, 2011

(30) Foreign Application Priority Data

Jan. 28, 2010 (JP) ................................ 2010-017011

(51) Int. Cl.
*G03B 15/03* (2006.01)
(52) U.S. Cl.
USPC ....................................................... 396/178
(58) Field of Classification Search
USPC ....................................................... 396/178
See application file for complete search history.

(56) References Cited

U.S. PATENT DOCUMENTS

| 5,541,688 | A  * | 7/1996  | Glogan .......................... 396/178 |
| 6,226,456 | B1 * | 5/2001  | Hazama et al. .................... 396/6  |
| 6,510,286 | B1 * | 1/2003  | Terada et al. .................. 396/177 |
| 6,640,055 | B2 * | 10/2003 | Nishimura et al. ........... 396/178 |
| 2004/0071459 | A1 * | 4/2004 | Ujikane et al. ................ 396/178 |
| 2004/0190892 | A1 * | 9/2004 | Yamane ........................ 396/448 |

FOREIGN PATENT DOCUMENTS

JP  08-184883 A  7/1996

* cited by examiner

*Primary Examiner* — Clayton E Laballe
*Assistant Examiner* — Linda B Smith
(74) *Attorney, Agent, or Firm* — Canon USA Inc IP Division (57) ABSTRACT

An imaging apparatus includes a light-emitting unit from which a lead wire and a flexible wiring board extend, a shaft member passing through the light-emitting unit, and a base member having formed therein two bearing portions pivotally supporting the shaft member. The light-emitting unit is caused to shift between an in-use state and a stored state according to the light-emitting unit being rotated around the shaft member. The flexible wiring board extending from the light-emitting unit extends into the imaging apparatus through a space between the two bearing portions in which the shaft member is located. The lead wire extending from the light-emitting unit extends into the imaging apparatus through an outside of one of the two bearing portions in which the shaft member is not located.

6 Claims, 9 Drawing Sheets

FIG. 9A under review IMAGING APPARATUS

BACKGROUND OF THE INVENTION

1. Field of the Invention

The present invention relates to an imaging apparatus including a light-emitting unit that is movable between an in-use state and a stored state.

2. Description of the Related Art

Heretofore, in such a type of imaging apparatus, when the imaging apparatus is in an imaging disabled state, such as power being turned off, the light-emitting unit is in the stored state, in which the light-emitting unit is stored in the imaging apparatus, and when the imaging apparatus is in an imaging enabled state, such as power being turned on, the light-emitting unit is in the in-use state, in which the light-emitting unit is protruded from the imaging apparatus.

Japanese Patent Application Laid-Open No. 08-184883 discusses a configuration in which respective openings are provided at a bottom portion of the light-emitting unit and at a portion of the imaging apparatus corresponding to the bottom portion of the light-emitting unit. Through these openings, cables and a flexible wiring board are mounted for wiring.

In a conventional imaging apparatus, since a number of cables are mounted through the opening, they become a large load when the light-emitting unit is driven to move. Particularly in low-temperature environments, the coating of the cables hardens, thus causing the drive force to decrease in driving the light-emitting unit.

SUMMARY OF THE INVENTION

According to an aspect of the present invention, an imaging apparatus includes a light-emitting unit from which a lead wire and a flexible wiring board extend, a shaft member passing through the light-emitting unit, and a base member having formed therein two bearing portions pivotally supporting the shaft member. The light-emitting unit is caused to shift between an in-use state and a stored state according to the light-emitting unit being rotated around the shaft member. The flexible wiring board extending from the light-emitting unit extends into the imaging apparatus through a space between the two bearing portions in which the shaft member is located. The lead wire extending from the light-emitting unit extends into the imaging apparatus through an outside of one of the two bearing portions in which the shaft member is not located.

According to an exemplary embodiment of the present invention, an imaging apparatus can be provided, which can reduce a wiring space inside the light-emitting unit, and which can reduce a drive force for shifting the light-emitting unit between an in-use state and a stored state.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the invention will be described in detail below with reference to the drawings.

Figure 1A:
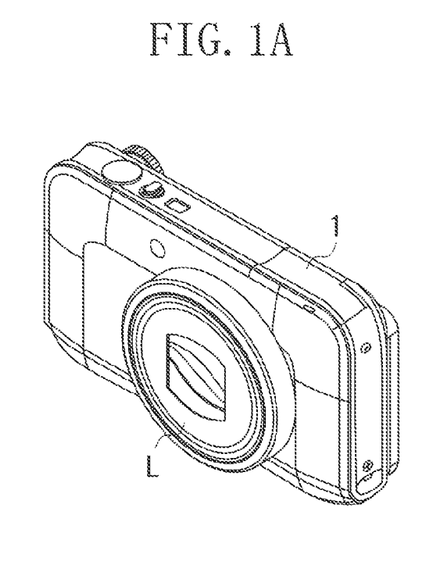
FIGS. 1A and 1B are perspective views of the external appearance of a digital camera according to an exemplary embodiment of the present invention.
Figure 1B:
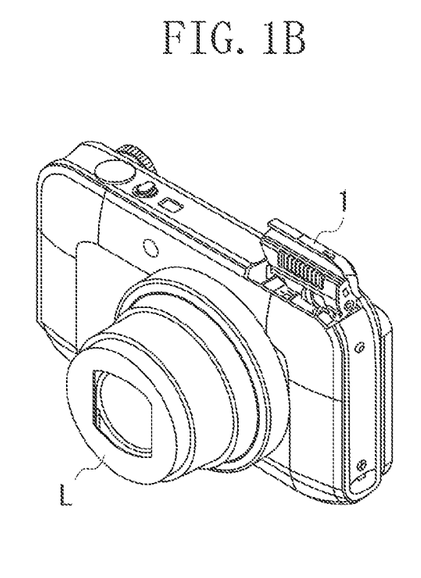

FIGS. 1A and 1B are perspective views of the external appearance of a digital camera according to an exemplary embodiment of the present invention, and illustrate states of the digital camera. FIG. 1A illustrates a power-off state as an example of an imaging disabled state, in which a lens barrel unit L is retracted, and the light-emitting unit 1 is stored. The light-emitting unit 1 is able to move between an in-use state and a stored state.

FIG. 1B illustrates a power-on state as an example of an imaging enabled state. In this state, the lens barrel unit L is protruded, and the light-emitting unit 1 is in the in-use state.

Figure 2A:
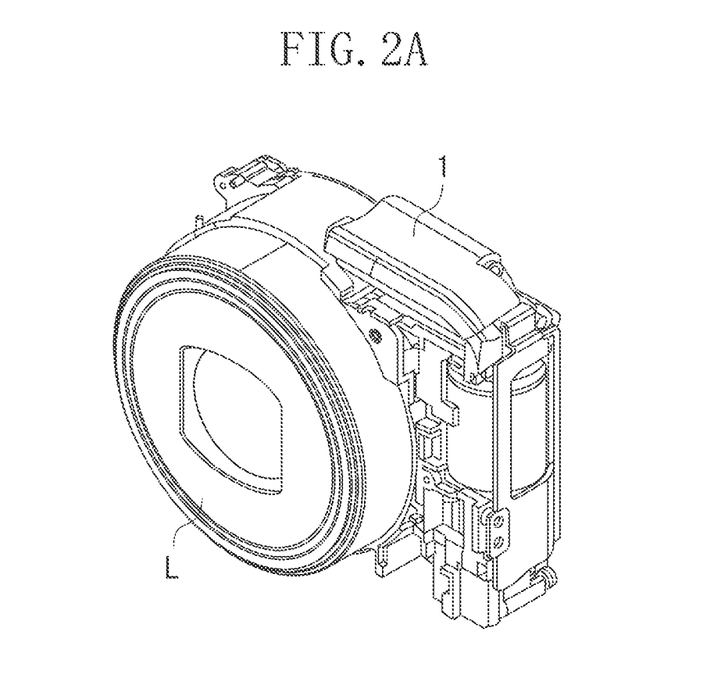
FIGS. 2A and 2B illustrate an interlocked movement between a lens barrel unit and a light-emitting unit.
Figure 2B:
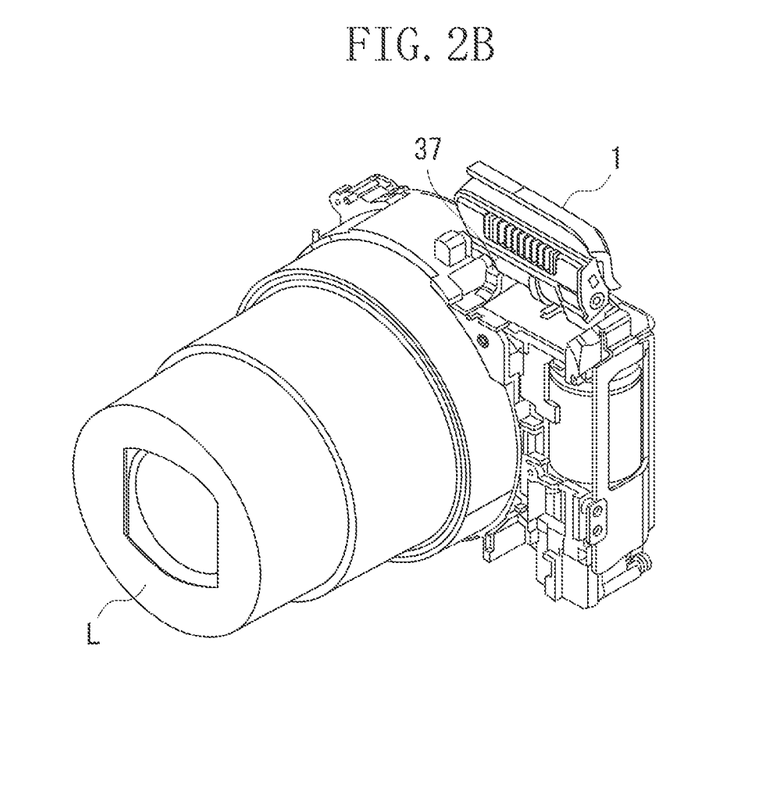

FIGS. 2A and 2B illustrate an interlocked movement between the lens barrel unit L and the light-emitting unit 1. In FIG. 2A, like in FIG. 2A, the lens barrel unit L is retracted, and the light-emitting unit 1 is stored. In FIG. 2B, like in FIG. 1B, the lens barrel unit L is in the protruded state, and the light-emitting unit 1 is in the in-use state.

In the digital camera according the present exemplary embodiment, when power supply is turned on, the lens barrel unit L is driven to protrude from the retracted state. When the power supply is turned off, the lens barrel unit L is driven to retract from the protruded state. When the lens barrel unit L is driven from the retracted state to the protruded state, a slider 37 in FIG. 2B moves forward along an optical axis, and the light-emitting unit L is driven from the stored state to the in-use state. When the lens barrel unit L is driven from the protruded state to the retracted state, the slider 37 moves rearward along the optical axis, and the light-emitting unit L is driven from the in-use state to the stored state.

Figure 3:
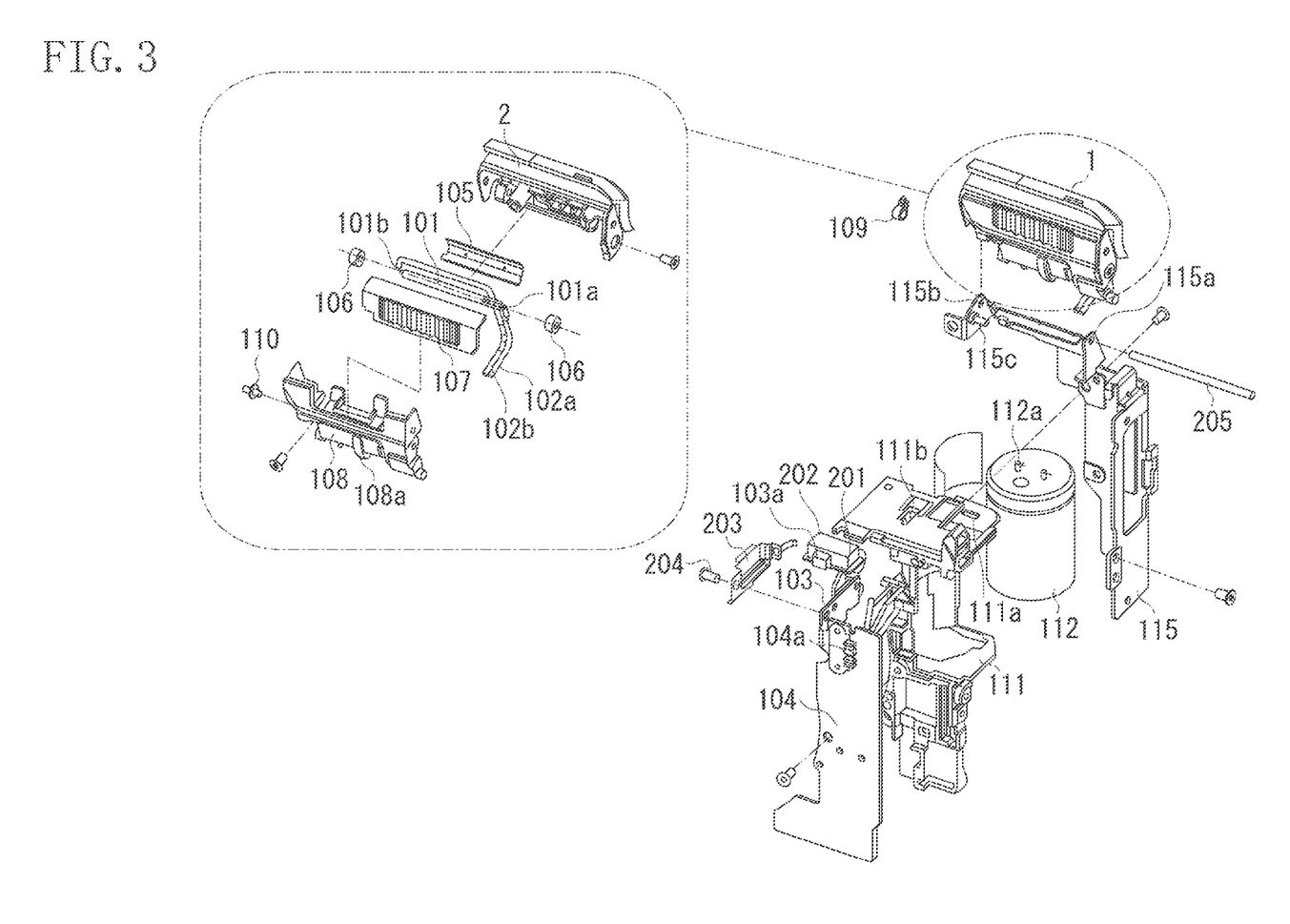
FIG. 3 is an exploded perspective view of the front side of the light-emitting unit.
Figure 4:
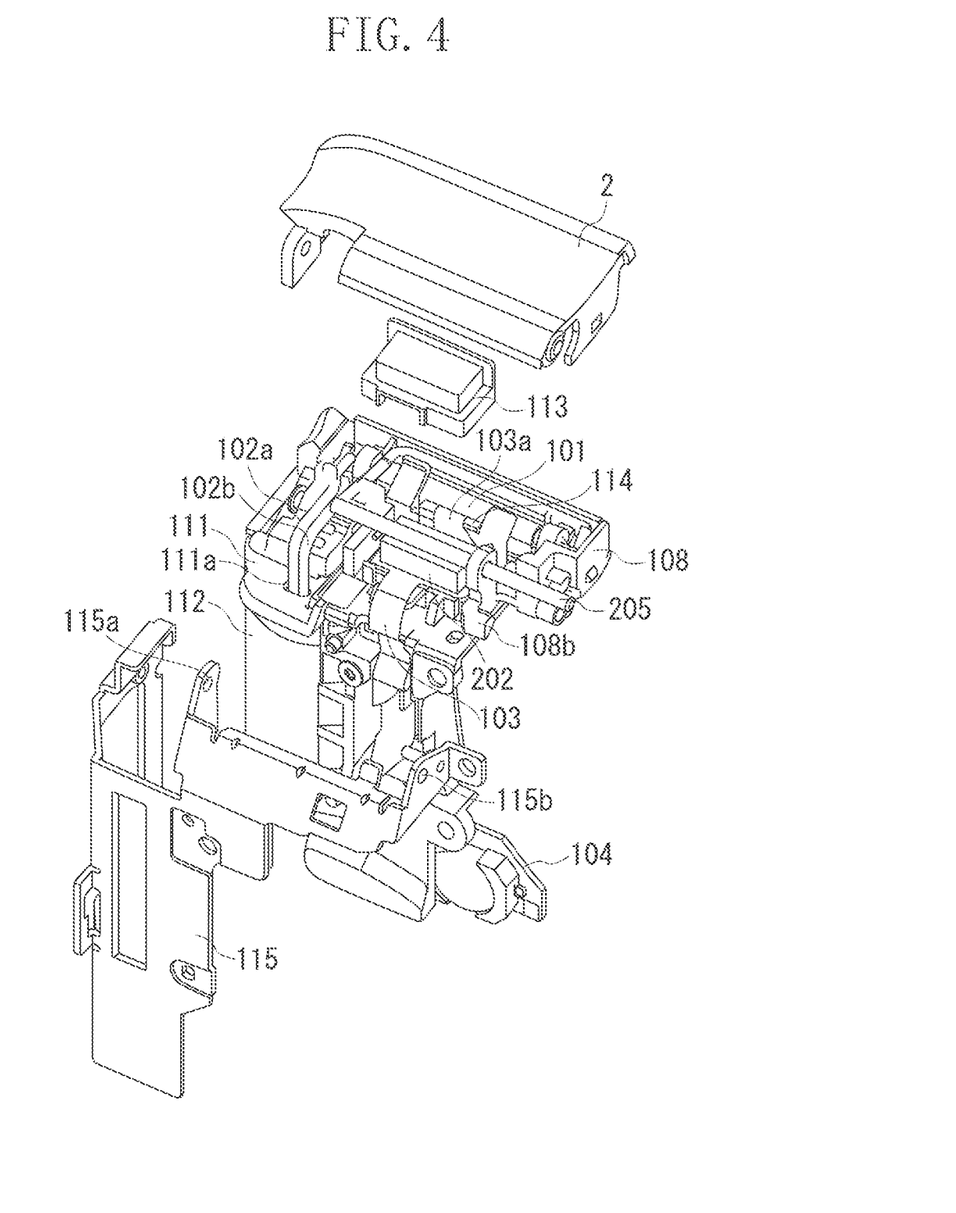
FIG. 4 is an exploded perspective view of the rear side of the light-emitting unit.

FIG. 3 is an exploded perspective view of the front side of the light-emitting unit 1, and FIG. 4 is an exploded perspective view of the rear side of the light-emitting unit 1. A xenon anode lead wire 102a is connected to an anode 101a of a xenon tube 101 as a flash tube, and a xenon cathode lead wire 102b is connected to a cathode 101b of the xenon tube 101. The xenon anode lead wire 102a is passed through a wiring hole 111a formed in a fixing member 111, and then connected to a plus terminal 112a of a flash-unit capacitor 112. The xenon cathode lead wire 102b is passed through the wiring hole 111a formed in the fixing member 111, and then connected to a flash-unit board 104.

A detection switch 201 and a trigger coil 202 are mounted on a flexible wiring board (flexible printed circuit board) 103, and the trigger coil 202 is placed inside the light-emitting unit 1. The flexible wiring board 103 has an extending portion 103a, which extends beyond a position where the trigger coil 202 is mounted. The trigger coil 202, which is held by being covered by a trigger cap 113, serves to secure a creeping distance between a high-voltage portion of the trigger coil 202 and other metals. The creeping distance refers to a shortest distance between two points along the surface of an insulation material. The flexible wiring board 103 is a one-sided flexible wiring board, on which a trigger plus signal wire, a trigger minus signal wire, and a detection signal wire of the detection switch are mounted for wiring.

The flexible wiring board 103 and the flash-unit board 104 for light emission control are connected by soldering on a connection area 104a. A reflector 105 collects light from the xenon tube 101. Xenon-tube rubber pieces 106 insulate the terminals of the xenon tube 101, and urge the xenon tube 101 toward the reflector 105. A prism panel 107 directs the light from the xenon tube 101 and the reflector 105 to a desired shooting range.

A flash-unit holder 108 accommodates the xenon tube 101 having the lead wires 102a and 102b connected thereto, the reflector 105, the flexible wiring board 103, and the prism panel 107. The light-emitting unit 1 is assembled by finally fixing the flash-unit cover 2 to the flash-unit holder 108 with screws.

A flash-unit shaft 205 is passed through through-holes 2a formed in the flash-unit case 2, and inserted into bearing holes 115a and 115b of a flash-unit base 115 as a base member. In this way, the light-emitting unit 1 is supported in a manner to be rotatable with respect to the flash-unit base 115. A shaft 110 supporting one end of a toggle spring 109 is press-fit into the flash-unit holder 108. The other end of the toggle spring 109 is supported by a shaft 115c provided on the flash-unit base 115. The toggle spring 109 urges the light-emitting unit 1 around the flash-unit shaft 205 to be movable between the in-use state and the stored state.

The flexible wiring board 103, the flash-unit board 104, and the flash-unit capacitor 112 are mounted to the fixing member 111. The flash-unit base 115 is also mounted to the fixing member 111 with screws.

The flexible wiring board 103 has a lever type detection switch 201 to detect whether the light-emitting unit 1 is in the in-use state or in the stored state. The detection switch 201 is fixed to the fixing member 111 in such a manner that a lever portion 201a of the detection switch 201 protrudes from an opening 111b of the fixing member 111. A cover member 203 is fixed to the fixing member 111 in such a manner as to hold the flexible wiring board 103 and cover the detection switch 201 and its peripheral area. Therefore, the flexible wiring board 103 is fixed to the fixing member 111 by being pinched between the cover member 203 and the fixing member 111. Since the cover member 203 is fixed to the fixing member 111, the detection switch 201 and its peripheral area except for the opening 111b is covered by the cover member 203.

As illustrated in FIG. 4, the xenon anode lead wire 102a and the xenon cathode lead wire 102b are collected on an outer side (in the left in FIG. 4) of a bearing hole 115a of the flash-unit base 115, by which the flash-unit shaft 205 is pivotally supported, and are passed through the wiring hole 111a of the fixing member 111.

Accordingly, the xenon anode lead wire 102a and the xenon cathode lead wire 102b extend into the digital camera through the outside of the bearing hole 115a as one bearing portion, by which the flash-unit shaft 205 is pivotally supported. More specifically, the lead wires can extend into the digital camera through a space in which the flash-unit shaft 205 is not located. Therefore, the radius of curvature of the lead wires can be made large, so that the load on the lead wires that occurs when the light-emitting unit 1 is moved between the in-use state and the stored state can be reduced. Moreover, since the distance to the flash-unit capacitor 112 can be made the shortest, electrical wiring loss can also be reduced.

On the other hand, the flexible wiring board 103, on which the trigger plus signal wire and the trigger minus signal wire are formed, extends into the digital camera through a space between the bearing holes 115a and 115b of the flash-unit base 115. Since the flash-unit shaft 205 is located in the space between the bearing holes 115a and 115b of the flash-unit base 115, if the lead wires were passed through about this area, they would pose an impediment to down-sizing of the digital camera. However, passing the flexible wiring board through this area never offers any chances of interfering with size reduction of the digital camera.

As described above, the lead wires have a problem of their coating hardening in low-temperature environments. For this reason, the drive force for the light-emitting unit is set in consideration of hardening states of the coating. In the present exemplary embodiment, since the flexible wiring board is used for the trigger plus signal line and the trigger minus signal line, the drive force for the light-emitting unit can be made smaller than when the lead wires are used for the signal lines. The farther the lead wires are separated from the axial center of the shaft member, the larger the rotational moment of the lead wires becomes, which hampers the turning motion of the light-emitting unit. Therefore, it is desired that the lead wires should be located close to the axial center of the shaft member. In the present exemplary embodiment, the lead wires are located on the outside of the shaft member, and the lead wires extend from the light-emitting unit in such a manner that they pass in the vicinity of the axial center of the shaft member. Therefore, the lead wires extending from the light-emitting unit are located in a position close to the axial center of the shaft member, so that the effects are small, which the lead wires have on the turning motion of the light-emitting unit.

Figure 5:
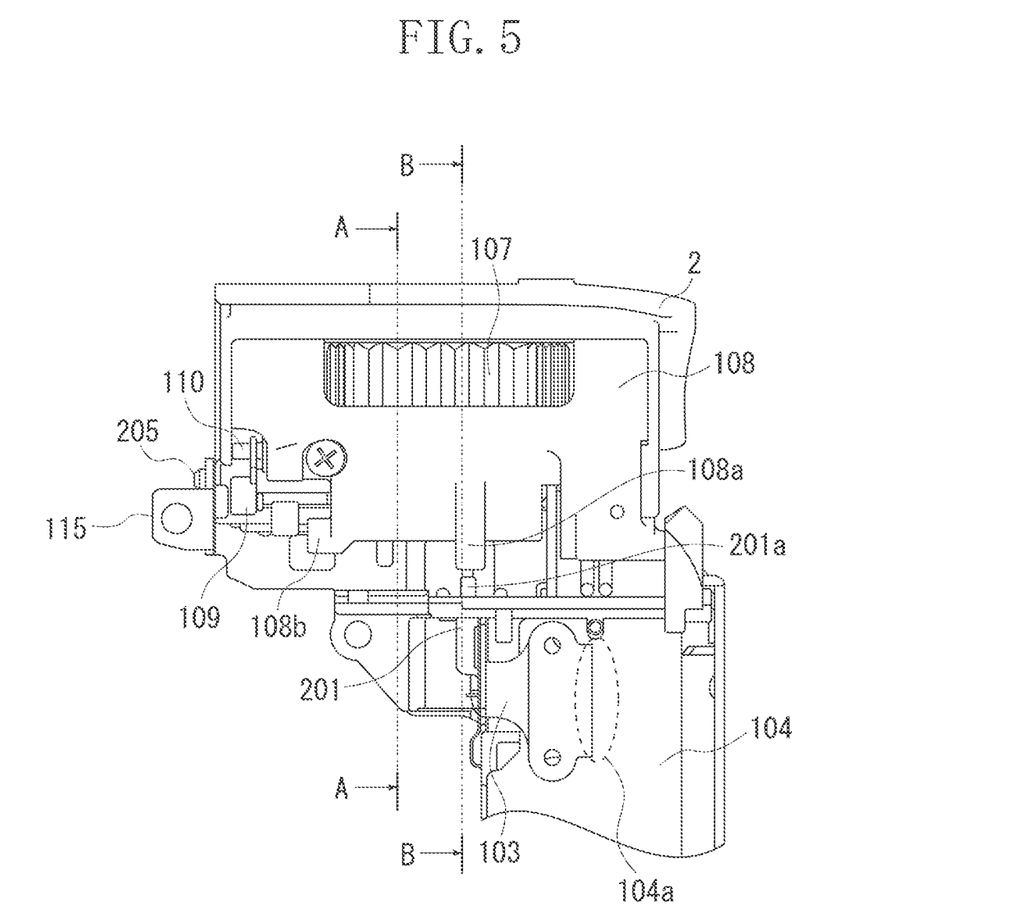
FIG. 5 is a front view of the light-emitting unit in an in-use state.
Figure 6:
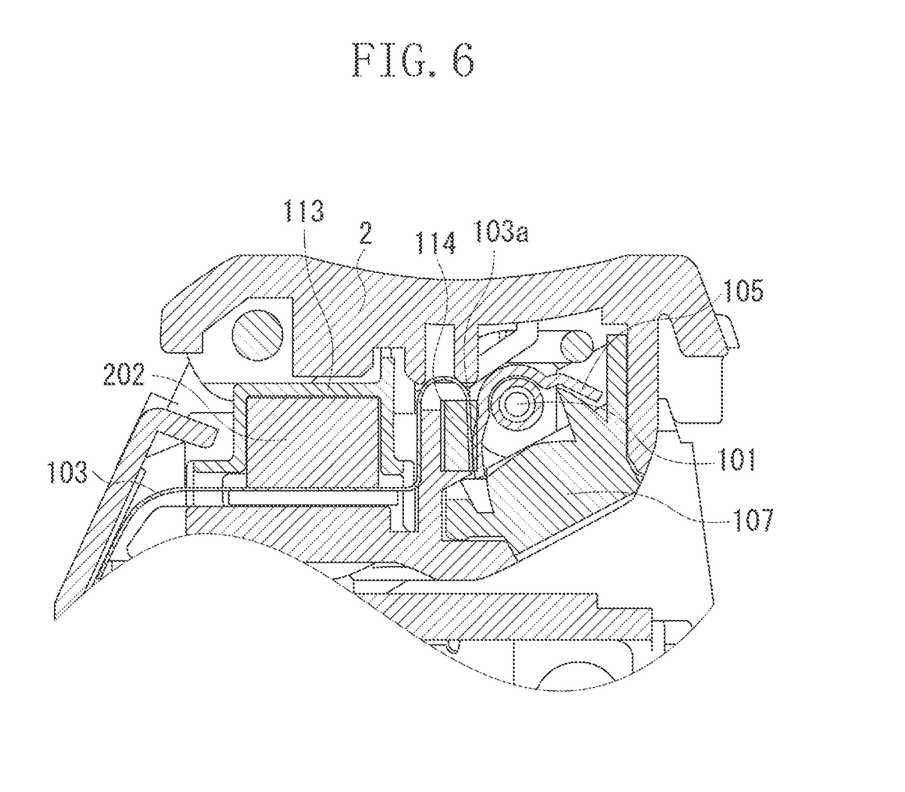
FIG. 6 is a sectional view of the light-emitting unit taken along line A-A in FIG. 5.

FIG. 5 is a front view of the light-emitting unit 1 in the in-use state, and FIG. 6 is a sectional view of the light-emitting unit 1 taken along line A-A in FIG. 5. Referring to FIG. 5, a structure in which a trigger voltage is applied to the reflector 105 will be described. The extending portion 103a of the flexible wiring board 103 has an opening for trigger wiring formed therein. The opening for trigger wiring is gold-plated to reduce a contact resistance. The extending portion 103c with the opening for trigger wiring is directly pressed to the reflector 105 by using an elastic member 114. This method obviates the need for a space for soldering and stringing the wires about, and, therefore, contributes to space savings. When the reflector 105 is pressed, if a pressing force is applied to only one side of the reflector 105, a problem is likely to arise that the rubber piece on one side of the xenon tube 105 is deformed greatly, causing the emitting region by the flash tube to get off a right position. In the present exemplary embodiment, however, since the trigger coil 202 is placed approximately at the center of the light-emitting unit 1, the extending portion 103a can be pressed to about the center of the reflector 105. In this way, the reflector 105 is prevented from being inclined by the pressing force of the elastic member 114.

Figure 7A:
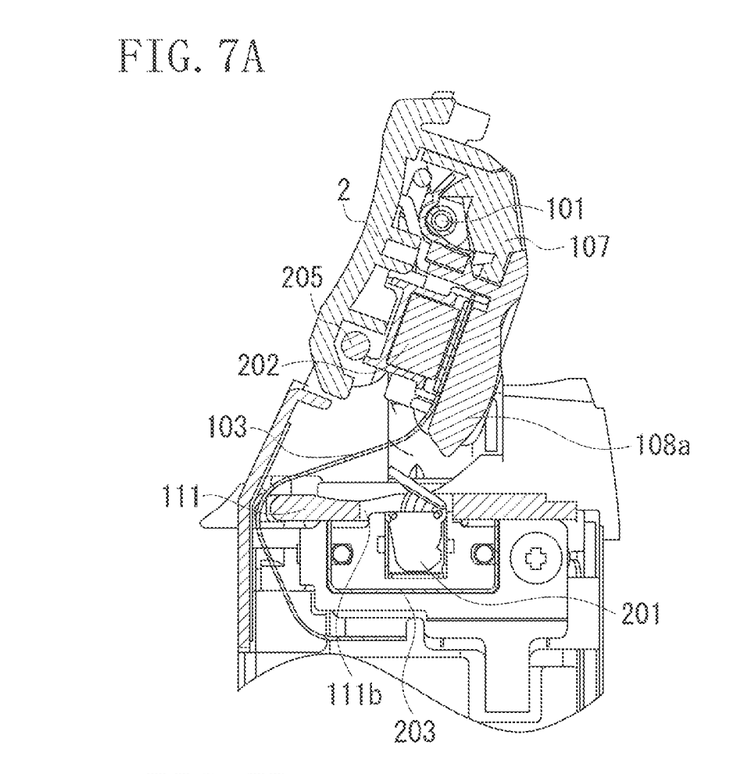
FIGS. 7A and 7B are sectional views of the light-emitting unit taken along line B-B in FIG. 5.
Figure 7B:
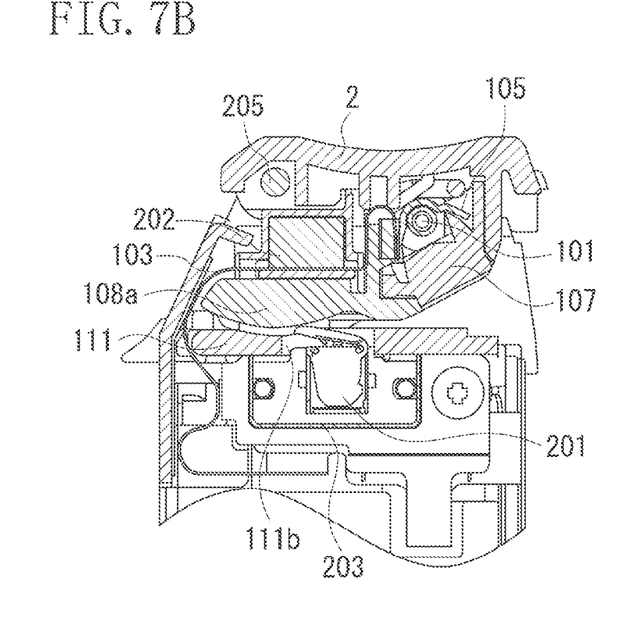

FIG. 7A is a sectional view of the light-emitting unit 1 taken along line B-B in FIG. 5. FIG. 7B is a sectional view of the light-emitting unit 1 in the stored state taken along line B-B in FIG. 5. As illustrated in FIGS. 7A and 7B, the lever type detection switch 201 is fixed to the fixing member 111. The fixing member 111 has the opening 111b. The detection switch 201 is fixed to the fixing member 111 in a manner that the lever portion 201a as a part of the detection switch 201 can protrude from the opening 111b. The detection switch 201 detects whether the light-emitting unit is in the in-use state or in the stored state.

The detection switch 201 is mounted on the flexible wiring board 103. When the protrusion 108a of the flash-unit holder 108 is pushing down the lever portion 201a of the detection switch 201, the detection switch 201 detects that the light-emitting unit 1 is in the stored state. On the other hand, when the protrusion 108a is away from the lever portion 201a of the detection switch 201, the detection switch 201 detects that the light-emitting unit 1 is in the in-use state. When the detection switch 201 detects that the light-emitting unit 1 is in the stored state, the digital camera controls the flash tube not to emit light, or when the detection switch 201 detects that the light-emitting unit 1 is in the in-use state, the digital camera controls the flash tube to emit light.

The flexible wiring board 103 is laid around between the fixing member 111 and the flash-unit base 115 and connected to the flash-unit board. 104.

As illustrated in FIG. 7B, the protrusion 108a of the flash-unit holder 108 is configured so that the protrusion 108a extends to the left in FIG. 7B beyond the position of the flash-unit shaft 205, serving as the rotating center of the light-emitting unit 1, when the light-emitting unit 1 is in the stored state. When the light-emitting unit 1 moves from the in-use state to the stored state, the protrusion 108a of the flash-unit holder 108 contacts and pushes the flexible wiring board 103, causing the flexible wiring board 103 to be placed into the state illustrated in FIG. 7B.

In other words, when the light-emitting unit 1 moves from the in-use state to the stored state, the protrusion 108a guides the flexible wiring board 103. Providing the protrusion 108a enables, when the light-emitting unit 1 is put into the stored state, a predetermined amount of the flexible wiring board 103 to be retained inside the light-emitting unit 1, so that the position of the flexible wiring board 103 is made stable when the light-emitting unit 1 is moved to the stored state.

Therefore, it is possible to prevent the flexible wiring board 103 from going slack in an unexpected place or having a sharp bend.

Figure 8A:
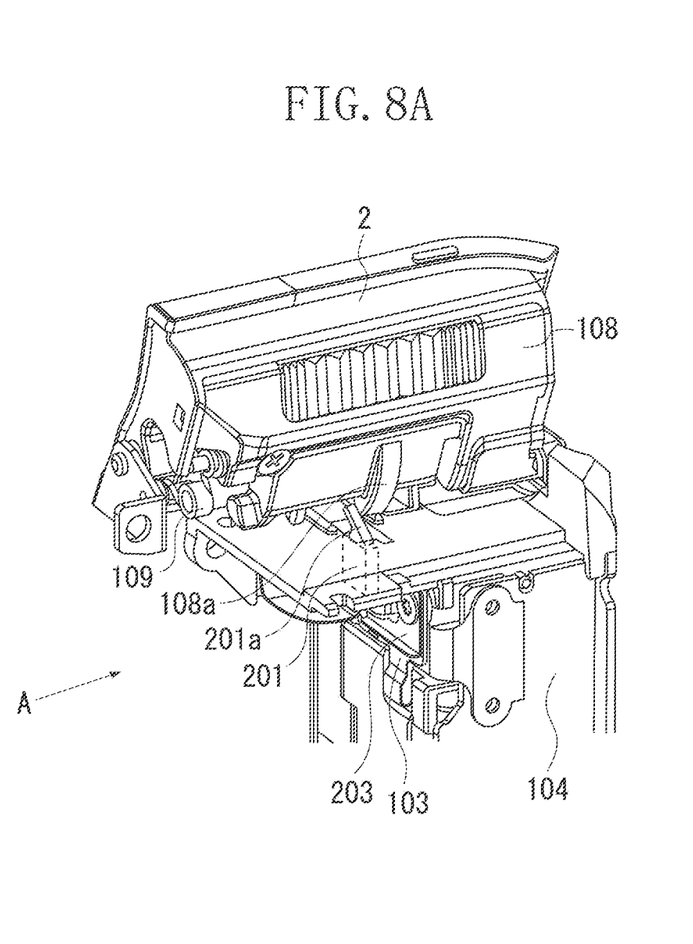
FIGS. 8A and 8B illustrate how a detection switch detects a state of the light-emitting unit.
Figure 8B:
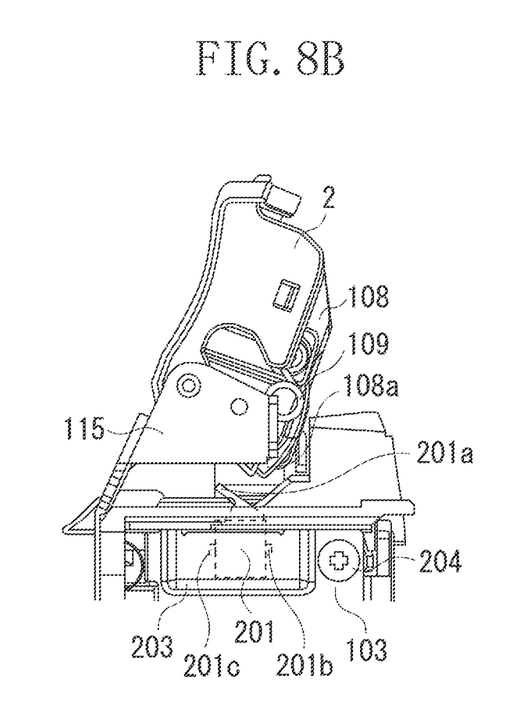

FIGS. 8A and 8B illustrate how the detection switch 201 detects a state of the light-emitting unit 1. FIG. 8A is a perspective view of the light-emitting unit 1 in the in-use state. FIG. 8B illustrates the light-emitting unit 1 in the in-use state as viewed from the direction of arrow A in FIG. 8A.

The lever type detection switch 201, which is mounted on the flexible wiring board 103, detects whether the light-emitting unit 1 is in the in-use state or in the stored state. The detection switch 201 is fixed to the fixing member 111 in such a manner that the lever portion 201a of the detection switch 201 protrudes from the opening 111b of the fixing member 111.

When the light-emitting unit 1 is in the in-use state, the lever portion 201a of the detection switch 201 does not contact anything. At this time, the switch signal is coupled to a common potential pattern provided in the detection switch 201, and the detection switch 201 outputs a switch-on signal.

When the light-emitting unit 1 moves from the in-use state to the stored state, the protrusion 108a of the flash-unit holder 108 comes into contact with the lever portion 201a of the detection switch 201 and furthermore pushes down the lever portion 201a. When the lever portion 201a is pushed down, since the detection switch 201 enters a state of having its switch signal insulated from the common potential pattern, the detection switch 201 outputs a switch-off signal.

A signal terminal 201b and a common terminal 201c of the detection switch 201 are electrically connected by soldering to the flexible printed circuit board 103. The detection switch 201 is fixed to the fixing member 111. The flexible wiring board 103 carrying the detection switch 201 is connected to the flash-unit board 104.

A switch-on signal and a switch-off signal output from the detection switch 201 together with a control line for flash emission are connected to a main circuit board (not illustrated). The digital camera controls the light-emitting unit 1 to emit light only when the detection switch 201 outputs a switch-on signal and detects that the light-emitting unit 1 is in the in-use state.

As illustrated in FIGS. 8A and 8B, the lever portion 201a of the detection switch 201 protrudes from the opening 111b of the fixing member 111. When the light-emitting unit 1 is in the in-use state, a surface with the opening 111b, from which the lever portion 201a protrudes, constitutes an external appearance of the digital camera. When the light-emitting unit 1 is in the stored state, the surface with the opening 111b is covered by the light-emitting unit 1, and, therefore, does not appear in the external appearance of the digital camera.

Generally, when the opening is formed in the surface which constitutes the external appearance of the digital camera, a problem arise that a foreign substance, such as sand or dust, may enter from the opening. If a foreign substance enters into the digital camera, this will result in a failure or damage in the digital camera. Moreover, it is possible for static electricity to enter from the opening. If static electricity enters the digital camera, malfunctioning may occur or a control integrated circuit (IC) may be destroyed.

Figure 9A:
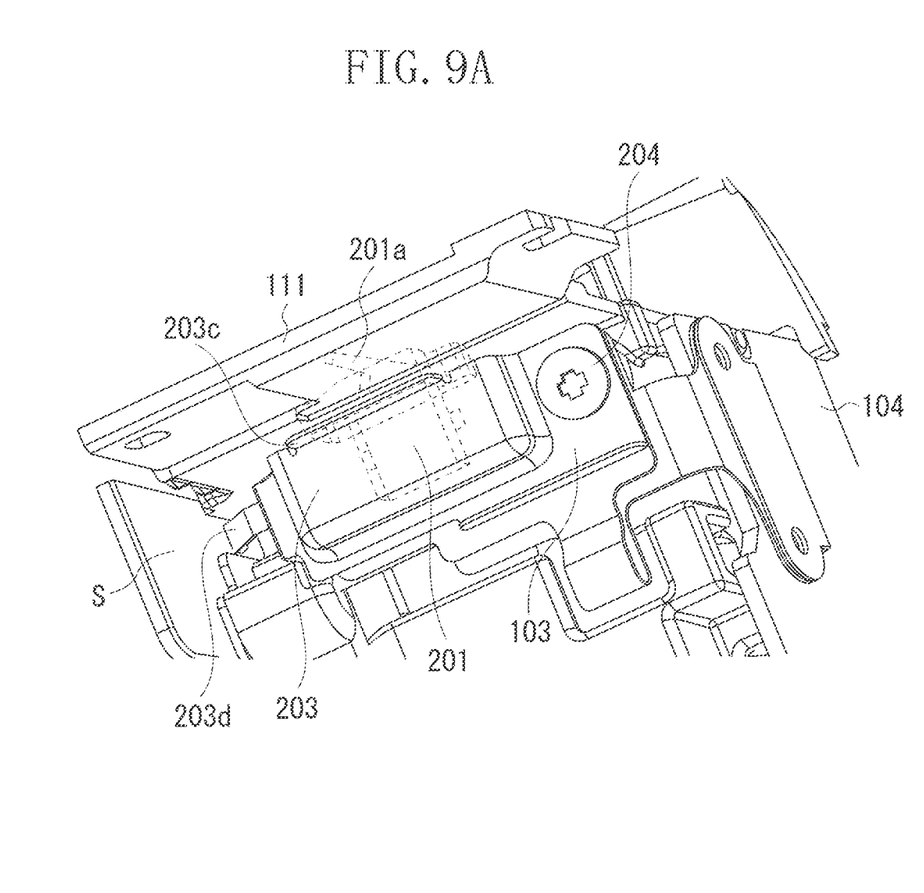
FIGS. 9A and 9B illustrate a cover member.
Figure 9B:
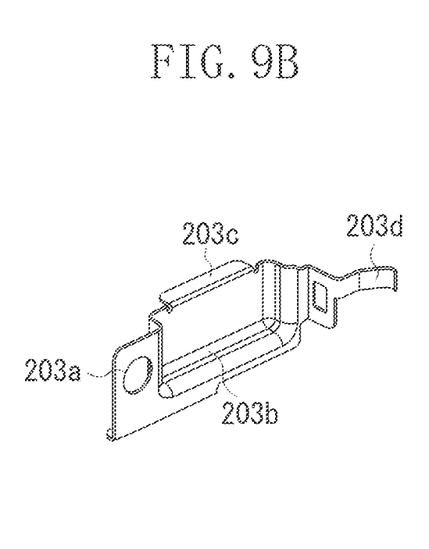

In view of the above-mentioned possible problems, in the digital camera according to the present exemplary embodiment, the cover member 203 is mounted above the flexible wiring board 103, and fixed to the fixing member 111 in such a manner as to cover the detection switch 201 and its peripheral area. FIG. 9A is a diagram illustrating how the cover member 203 is fixed to the fixing member 111. FIG. 9B is a diagram illustrating a shape of the cover member 203. As illustrated in FIG. 9B, the cover member 203 has a screw hole 203a formed for fixing the cover member 203 to the fixing member 111 with a screw 204, and also has a cover portion 203b to cover the detection switch 201 and its peripheral area. The cover member 203 has a contact portion 203c. The cover member 203 is fixed to the fixing member 111 with the contact portion 203c attached to that surface of the fixing member 111, in which the opening 111b is formed.

As illustrated in FIG. 9A, when the cover member 203 is fixed to the fixing member 111, the cover member 203 covers the detection switch 201 and its peripheral area except for the opening 111b. Therefore, even if a foreign substance, such as sand or dust, enters, the foreign substance stays inside the cover portion 203b without entering the inside of the digital camera.

The cover member 203 is made of a conductive material, and is provided with an arm portion 203d used to contact a chassis member S at earth ground potential of the digital camera. When the cover member 203 is fixed to the fixing member 111, the contact portion 203c is in contact with that surface of the fixing member 111 in which the opening 111b is formed.

Therefore, the cover member 203 extends to a position closer to the opening 111b than the signal terminal 201b or the common potential terminal 201c as the electric contact point between the detection switch 201 and the flexible wiring board 103.

In other words, the creeping distance from the opening 111b to the signal terminal 201b or the common potential terminal 201c of the detection switch 201 is longer than the creeping distance from the opening 111b to the cover member 203.

Therefore, even if static electricity enters from the opening 111b, the static charge is discharged to the cover member 203, but not discharged to the signal terminal 201b or the common potential terminal 201c. Therefore, the static charge on the cover member 203 is not discharged secondarily.

As has been described above, according to the present exemplary embodiment, by forming the flexible printed circuit board in such a way as to include the trigger plus signal wire and the trigger minus signal wire, the wiring space in the light-emitting unit can be reduced, and the drive force used to move the light-emitting unit to the in-use state or the stored state can also be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-017011 filed Jan. 28, 2010, which is hereby incorporated by reference herein in its entirety.

What is claimed is:

1. An imaging apparatus comprising:
   a light-emitting unit configured to rotate between an in-use state and a stored state and to accommodate a flash tube and a trigger coil;
   a lead wire configured to be connected to the flash tube, the lead wire extending from the light-emitting unit;
   a flexible wiring board on which the trigger coil is mounted, the flexible wiring board extending from the light-emitting unit;
   a shaft member configured to be performed as a rotation axis of the light-emitting unit; and
   a base member having formed therein two bearing portions pivotally supporting the shaft member,
   wherein the flexible wiring board extends into the imaging apparatus through a space between the two bearing portions in which the shaft member is located, and the lead wire extends into the imaging apparatus through a space outside one of the two bearing portions in which the shaft member is not located.

2. The imaging apparatus according to claim 1, wherein the lead wire extends from the light-emitting unit in such a manner as to pass through a vicinity of an axial center of the shaft member.

3. The imaging apparatus according to claim 1, wherein when the light-emitting unit shifts from the in-use state to the stored state, a protrusion formed on the light-emitting unit pushes in the flexible wiring board to guide a position of the flexible wiring board when the light-emitting unit is in the stored state.

4. The imaging apparatus according to claim 1, wherein the light-emitting unit includes a reflector, wherein the flexible wiring board has an extending portion which extends to the reflector, and wherein the extending portion includes a trigger wiring portion which contacts the reflector.

5. The imaging apparatus according to claim 4, wherein the trigger wiring portion is directly pressed to the reflector by using an elastic member.

6. The imaging apparatus according to claim 5, wherein the trigger wiring portion contacts approximately center of the reflector.

* * * * *